(12) United States Patent
Cousins et al.

(10) Patent No.: US 11,014,811 B2
(45) Date of Patent: May 25, 2021

(54) WATER GAS SHIFT PROCESS

(71) Applicant: JOHNSON MATTHEY PUBLIC LIMITED COMPANY, London (GB)

(72) Inventors: Matthew John Cousins, Cleveland (GB); Michele Marigo, Cleveland (GB); Nicola Campbell McKidd, Cleveland (GB); William Maurice Sengelow, Cleveland (GB)

(73) Assignee: Johnson Matthey Public Limited Company, London (GB)

( * ) Notice: Subject to any disclaimer, the term of this patent is extended or adjusted under 35 U.S.C. 154(b) by 382 days.

(21) Appl. No.: 15/771,201

(22) PCT Filed: Oct. 14, 2016

(86) PCT No.: PCT/GB2016/053182
§ 371 (c)(1),
(2) Date: Apr. 27, 2018

(87) PCT Pub. No.: WO2017/072480
PCT Pub. Date: May 4, 2017

(65) Prior Publication Data
US 2018/0354787 A1 Dec. 13, 2018

(30) Foreign Application Priority Data
Oct. 29, 2015 (GB) .................................... 1519133

(51) Int. Cl.
*C01B 3/16* (2006.01)
*B01J 35/02* (2006.01)
(Continued)

(52) U.S. Cl.
CPC .............. *C01B 3/16* (2013.01); *B01J 23/862* (2013.01); *B01J 23/8873* (2013.01);
(Continued)

(58) Field of Classification Search
CPC ........................................................ C01B 3/16
See application file for complete search history.

(56) References Cited

U.S. PATENT DOCUMENTS

| 3,922,337 A | 11/1975 | Campbell et al. |
| 4,328,130 A | 5/1982 | Kyan |

(Continued)

FOREIGN PATENT DOCUMENTS

| DE | 3819436 | 12/1989 |
| EP | 1487578 | 12/2004 |

(Continued)

OTHER PUBLICATIONS

PCT/GB2016/053182, International Search Report dated Jan. 3, 2017.
(Continued)

*Primary Examiner* — Douglas B Call
(74) *Attorney, Agent, or Firm* — BakerHostetler

(57) ABSTRACT

A process is described for increasing the hydrogen content of a synthesis gas mixture comprising hydrogen, carbon oxides and steam, comprising the steps of: passing the synthesis gas mixture at an inlet temperature in the range 170-500° C. over a water-gas shift catalyst to form a hydrogen-enriched shifted gas mixture, wherein the water-gas shift catalyst is in the form of a cylindrical pellet having a length C and diameter D, wherein the surface of the cylindrical pellet has two or more flutes running along its length, said cylinder having no through-holes and domed ends of lengths A and B such that (A+B+C)/D is in the range 0.25 to 0.25, and (A+B)/C is in the range 0.03 to 0.30.

18 Claims, 1 Drawing Sheet

Figure 1:
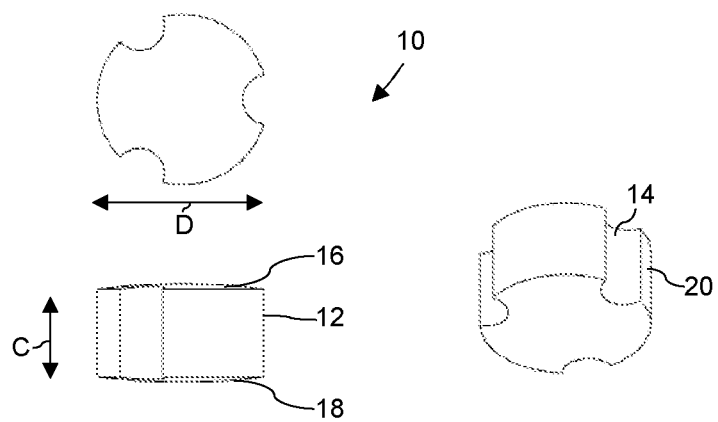

(51) Int. Cl.
    *B01J 23/86*   (2006.01)
    *C01B 3/48*    (2006.01)
    *B01J 23/887*  (2006.01)

(52) U.S. Cl.
    CPC ............ *B01J 35/026* (2013.01); *C01B 3/48* (2013.01); *C01B 2203/0283* (2013.01); *C01B 2203/1017* (2013.01); *C01B 2203/1047* (2013.01); *Y02P 20/52* (2015.11)

(56) References Cited

U.S. PATENT DOCUMENTS

| | | |
|---|---|---|
| 4,499,203 A | 2/1985 | Toulhoat et al. |
| 4,721,611 A | 1/1988 | Pinto et al. |
| 5,656,566 A | 8/1997 | Ward |
| 9,751,039 B2 | 9/2017 | Gebald et al. |
| 2003/0026747 A1 | 2/2003 | Zhu et al. |
| 2006/0233687 A1 | 10/2006 | Hojlund Nielsen |
| 2008/0257147 A1 | 10/2008 | Gregory |
| 2009/0152500 A1 | 6/2009 | Chen et al. |
| 2011/0166013 A1 | 7/2011 | Cairns et al. |
| 2012/0202681 A1 | 8/2012 | Park et al. |
| 2012/0214881 A1 | 8/2012 | Wahlstrom et al. |
| 2012/0223274 A1 | 9/2012 | Hinton et al. |
| 2012/0232322 A1 | 9/2012 | Wilson et al. |
| 2014/0115955 A1 | 5/2014 | McNeff et al. |
| 2015/0014595 A1 | 1/2015 | Van Dijk et al. |
| 2016/0074844 A1 | 3/2016 | Freer et al. |

FOREIGN PATENT DOCUMENTS

| | | |
|---|---|---|
| EP | 2049249 | 4/2009 |
| EP | 2141118 A1 | 1/2010 |
| EP | 2237882 | 10/2010 |
| EP | 2240273 | 10/2010 |
| EP | 2323762 | 5/2011 |
| EP | 2442904 | 4/2012 |
| EP | 2599541 | 6/2013 |
| EP | 2924002 | 9/2015 |
| GB | 940960 | 11/1963 |
| GB | 1087987 | 10/1967 |
| GB | 1131631 | 10/1968 |
| GB | 1213343 | 11/1970 |
| GB | 1323064 | * 7/1973 |
| GB | 1357335 | 6/1974 |
| GB | 2288341 | 10/1995 |
| WO | WO 2003/002452 A1 | 1/2003 |
| WO | WO 2003/082468 A1 | 10/2003 |
| WO | WO 2008/012255 A2 | 1/2008 |
| WO | WO 2009/076119 A1 | 6/2009 |
| WO | WO 2009/078979 A2 | 6/2009 |
| WO | WO 2010/028324 A2 | 3/2010 |
| WO | WO 2010/029323 A1 | 3/2010 |
| WO | WO 2010/029324 A1 | 3/2010 |
| WO | WO 2010/029325 A1 | 3/2010 |
| WO | WO 2010/045232 A1 | 4/2010 |
| WO | WO 2010/146379 A1 | 12/2010 |
| WO | WO 2010/146380 A1 | 12/2010 |
| WO | WO 2011/055132 A1 | 5/2011 |
| WO | 2014/170184 A1 | 10/2014 |
| WO | WO 2015/007322 A1 | 1/2015 |

OTHER PUBLICATIONS

PCT/GB2016/053182, Written Opinion dated Jan. 3, 2017.
GB1617425.2, Combined Search and Examination Report under Section 17 and 18(3) dated Apr. 19, 2017.
GB1519133.1, Search Report under Section 17(5) dated May 10, 2016.

* cited by examiner

WATER GAS SHIFT PROCESS

CROSS-REFERENCE TO RELATED APPLICATIONS

This application is the National Stage of International Patent Application No. PCT/GB2016/053182, filed Oct. 14, 2016, which claims priority from Great Britain Patent Application No. 1519133.1, filed Oct. 29, 2015, the disclosures of each of which are incorporated herein by reference in their entireties for any and all purposes.

This invention relates to water-gas shift processes.

The water gas shift process is well established as a means to increase the hydrogen content and/or reduce the carbon monoxide content of synthesis gases produced by steam reforming, partial oxidation and gasification of hydrocarbon and carbonaceous feedstocks. The reaction may be depicted as follows.

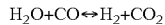

$$H_2O + CO \leftrightarrow H_2 + CO_2$$

The reaction is mildly exothermic and a favourable equilibrium is obtained at low temperatures. To achieve acceptable conversion however, iron-containing catalysts have found widespread use as so-called high-temperature-shift (HTS) catalysts. HTS catalysts can be used in conjunction with medium and low temperature catalysts, which are typically based on copper, depending on the process requirements. The volume and choice of which materials are used depends on the required limit for carbon monoxide in the product gas stream and also the impurities that are present. The bed size is governed by these limits and the required life time, which makes most HTS catalyst vessels relatively large. Industrial water-gas shift catalysts are based on pellets with a simple cylindrical shape. Operators of water gas shift processes therefore face the problem of trading off activity from smaller pellets at the cost of increased pressure drop, or decreased pressure drop at the cost of decreased performance.

U.S. Pat. No. 4,328,130 discloses a shaped catalyst in the form of a cylinder with a plurality of longitudinal channels extending radially from the circumference of the cylinder and defining protrusions there-between, wherein the protrusions have a maximum width greater than the maximum width of the channels. The catalysts depicted have 2, 3 or 4 truncated-V shaped channels.

WO2010/029325 discloses a catalyst unit in the form of a cylinder having a length C and diameter D, wherein the exterior surface of the unit has two or more flutes running along its length, said cylinder having domed ends of lengths A and B such that (A+B+C)/D is in the range 0.50 to 2.00, and (A+B)/C is in the range 0.40 to 5.00.

Whereas these catalysts offer improved geometric surface area, they do not solve the problems associated with large beds of water-gas shift catalysts. This invention seeks to overcome the diffusion limitations that limit the current materials performance.

Accordingly, the invention provides a process for increasing the hydrogen content of synthesis gas mixture comprising hydrogen, carbon oxides and steam, comprising the steps of: passing the synthesis gas mixture at an inlet temperature in the range 170-500° C. over a water-gas shift catalyst to form a hydrogen-enriched shifted gas mixture, wherein the water-gas shift catalyst is in the form of a cylindrical pellet having a length C and diameter D, wherein the surface of the cylindrical pellet has two or more flutes running along its length, said cylinder having no through-holes and domed ends of lengths A and B such that (A+B+C)/D is in the range 0.25 to 1.25, and (A+B)/C is in the range 0.03 to 0.3.

The shaped catalyst pellets offer process improvements including an activity increase in high temperature shift of >4% and a decrease in pressure drop of >10% compared to commercially available catalysts.

The synthesis gas in the present invention may be any synthesis gas comprising hydrogen and carbon oxides, for example one containing hydrogen, carbon monoxide and carbon dioxide formed by the catalytic steam reforming, autothermal reforming or secondary reforming of hydrocarbon feedstocks such as natural gas or naphtha, or by the gasification of carbonaceous or biomass feedstocks such as coal or biomass. The carbon monoxide content of the synthesis gas fed to the catalyst may be in the range 3-70 mole % on a dry gas basis. For synthesis gas mixtures derived from steam reforming, the carbon monoxide content may be in the range 10-30 mole % on a dry gas basis and for synthesis gas mixtures derived from partial oxidation or gasification, the carbon monoxide content may be in the range 30-70 mole % on a dry-gas basis. The synthesis gas mixture may also be a shifted synthesis gas mixture obtained from an upstream water-gas shift process, in which case the carbon monoxide content may be in the range 3-10 mole % on a dry gas basis. By "dry gas basis" we mean the composition of the gas mixture disregarding the steam content.

The synthesis gas requires sufficient steam to allow the water-gas shift reaction to proceed. Whereas synthesis gases derived from processes such as steam reforming may contain sufficient steam, reactive synthesis gases derived from partial oxidation or gasification processes generally are deficient in steam and steam is then preferably added. Where steam addition is required, the steam may be added by direct injection or by another means such as a saturator or steam stripper. The amount of steam should desirably be controlled such that the total steam:synthesis gas (i.e. dry gas) volume ratio in the synthesis gas mixture fed to the catalyst is in the range 0.3:1 to 4:1, preferably in the range 0.3:1 to 2.5:1.

The inlet temperature of the water-gas shift process may be in the range 170-500° C.

The water-gas shift process may be operated with different catalysts depending on the inlet temperature and the amount of carbon monoxide conversion required.

For high temperature shift catalysts, the inlet temperature is preferably in the range 280-500° C. more preferably 300-450° C. and most preferably 310-380° C. so that the performance of the catalyst over an extended period is maximised. The shift process is preferably operated adiabatically without cooling of the catalyst bed, although if desired some cooling may be applied for example by passing cooling water under pressure through tubes disposed in the catalyst bed. The exit temperature from the shift vessel is preferably ≤600° C., more preferably ≤550° C. to maximise the life and performance of the catalyst. The process is preferably operated at elevated pressure in the range 1-100 bar abs, more preferably 15-50 bar abs.

In a low temperature shift process, a gas containing carbon monoxide (preferably under 4% v/v on a dry basis) and steam (with a steam to total dry gas molar ratio typically in range 0.3 to 1.5) is fed at an inlet temperature in the range 170-250° C. and passed over a copper-containing catalyst in an adiabatic fixed bed with at an outlet temperature in the range 200 to 300° C. at a pressure in the range 15-50 bar abs. Usually the inlet gas is the product of high temperature shift in which the carbon monoxide content has been decreased by reaction over an iron catalyst at an outlet temperature in the range 400 to 500° C., followed by cooling by indirect heat exchange. The outlet carbon monoxide content is typically in the range 0.1 to 1.0%, especially under 0.5% v/v on a dry basis.

In a medium temperature shift process, the gas containing carbon monoxide and steam is fed at a pressure in the range 15-50 bar abs to a copper-containing catalyst at an inlet temperature typically in the range 200 to 240° C. although the inlet temperature may be as high as 280° C., and the outlet temperature is typically up to 300° C. but may be as high as 360° C.

In so-called isothermal shift, a copper-containing catalyst is used in contact with heat exchange surfaces. The coolant conveniently is water under such a pressure such that partial, or complete, boiling takes place. The inlet temperature may be in the range 200-300° C. A suitable pressure is 15 to 50 bar abs and the resulting steam can be used, for example, to drive a turbine or to provide process steam for shift, or for an upstream stage in which the shift feed gas is generated. The water can be in tubes surrounded by catalyst or vice versa.

The process is desirably operated above the dew point to prevent condensation on the catalyst.

Any suitable water-gas shift catalyst that is suitably active at the inlet temperature may be used.

The water gas shift catalyst may be a high-temperature shift catalyst comprising one or more iron oxides stabilised with chromia and/or alumina and which may optionally contain zinc oxide and one or more copper compounds. Conventional chromia-promoted magnetite catalysts may be used. Iron oxide/chromia shift catalysts are conventionally made by precipitation of iron and chromium compounds (that decompose to the oxides upon heating) from a solution of iron and chromium salts by the addition of a suitable alkaline reactant, e.g. sodium hydroxide or carbonate. The resulting precipitate is then washed, dried, and optionally calcined and tableted to form catalyst precursor pellets. The precursor preferably has an iron oxide content (expressed as $Fe_2O_3$) of 60 to 95% by weight. Preferably the iron to chromium atomic ratio in the precursor is in the range 6 to 20, particularly 8 to 12. The precursor may contain oxides of other metals, e.g. aluminium, manganese, or, especially, copper. Particularly preferred precursors have an iron to copper atomic ratio of 10:1 to 100:1. Prior to use for the shift reaction, the pellets are subjected to reduction conditions wherein the iron oxide is reduced to magnetite ($Fe_3O_4$) and any chromium trioxide present reduced to the sesquioxide, chromia ($Cr_2O_3$). This reduction is often carried out in the reactor wherein the shift reaction is to be effected. The activity of the catalyst may be significantly increased by incorporating into the catalyst precursor particles of aspect ratio of at least 2 and a maximum dimension of at least 5000 Å (500 nm), and preferably less than 15000 Å (1500 nm) into the catalyst precursor pellets. Preferably the chromia-promoted magnetite catalyst comprises acicular iron oxide particles. Such catalysts compositions are described in U.S. Pat. No. 5,656,566.

Alternatively, it may be desirable to at least partially replace the chromia in the iron-based HTS catalyst with alumina or another stabilising oxide. Zinc oxide and copper may desirably also be present. Such catalysts are described for example in EP2237882.

Alternatively, the water-gas shift catalyst may comprise a metal-doped zinc oxide/alumina composition. For example, a suitable catalyst containing oxides of zinc and aluminium together with one or more promoters selected from Na, K, Rb, Cs, Cu, Ti, Zr, rare earth elements and mixtures thereof is described in EP2924002.

Alternatively, the water gas shift catalyst may be a copper-based low-temperature shift catalyst, a medium-temperature shift catalyst, or an isothermal shift catalyst. Such catalysts may comprise copper, zinc oxide and alumina. Preparation methods for such catalysts are described, for example, in EP2049249, EP2599541, EP1487578, EP2240273 and EP2442904.

Alternatively, the water gas shift catalyst may be a sour shift catalyst. Sour shift catalysts may comprise 1-5% wt cobalt and 5-15% molybdenum, optionally with additional oxides such as magnesia and/or titanium dioxide, on a suitable support such as alumina or calcium aluminate.

Such catalysts are often made by impregnating an oxidic support composition with cobalt and molybdenum compounds and heating the resulting composition to convert the cobalt and molybdenum compounds to their respective oxides. In use, or before use if desired, the cobalt and molybdenum oxides may be sulphided with a suitable sulphur compound such as hydrogen sulphide. Such catalysts are described for example in GB 1087987, GB1213343 and GB940960.

In a preferred embodiment the water-gas shift catalyst is a high temperature shift catalyst and the inlet temperature is in the range 280-500° C.

The pellets may be fabricated from a powdered water-gas shift catalyst composition thereby generating the catalyst directly. Alternatively, shaped catalyst support materials may be impregnated with one or more soluble compounds of the catalytically active metals, or a slurry of one or more insoluble compounds of a catalytically active metals may be applied to the surface.

Powdered water gas shift catalyst compositions containing the catalytically active metals may be prepared by mixing the respective metal oxides, carbonates, hydroxides or hydroxy-carbonates, or may be formed by known precipitation techniques, whereby a mixture of soluble salts is precipitated, e.g. using an alkaline precipitating agent, dried and optionally calcined.

Pelleting is used for the present invention. The method for fabricating the catalyst pellet may therefore comprise the steps of (i) feeding a water-gas shift catalyst powder, optionally with a pelleting aid or lubricant such as graphite or magnesium stearate, into a pelleting die, (ii) compressing the powder to form a shaped unit and recovering the shaped unit from the pelleting die. Post-pelleting treatments such as a calcination may be performed if desired. The calcination may be performed in air or in an inert gas such as nitrogen.

If desired, the powdered water-gas shift catalyst may be subjected to a reduction step and passivation prior to pelleting. In the reduction, a reducing gas stream (e.g. a hydrogen and/or carbon monoxide containing gas stream) is applied to the powder to reduce the catalytically active metal to its elemental form. Passivation, or a controlled oxidation, to form a protective oxide layer on the reduced powder is required before pelleting. Such reduced and passivated materials are disclosed in EP2442904.

The present invention is particularly suited to high temperature shift catalysts comprising iron and chromium oxides, as the improved properties permit a post-pelleting treatment step whereby the undesirable Cr(VI) level in the catalyst may be reduced. The Cr(VI) level may be reduced by heating the shaped pellets preferably in an inert atmosphere, such as a nitrogen atmosphere, after shaping or by exposing the calcined pellets to a reducing agent such as a reducing gas (e.g. a hydrogen and/or CO containing gas) or solid reductant (e.g. a sugar or stearate).

The aspect ratio of the cylindrical pellet, which may be defined as overall length divided by the diameter, i.e. (A+B+C)/D is in the range 0.25 to 1.25, preferably 0.5 to 1.0, more preferably 0.55 to 0.70 and especially 0.55 to 0.66.

Both ends of the pellet are domed. The domed ends have lengths A and B, which may be the same or different but are preferably the same. The dome ratio to the cylindrical part of the catalyst unit (i.e. (A+B)/C) is in the range 0.03 to 0.3, preferably 0.05 to 0.25 and more preferably 0.10 to 0.25. This dome size has been found most suitable when combined with the flutes for the water-gas shift catalysts.

In the present invention, C is preferably in the range 2.5 to 6 mm, more preferably 3 to 5 mm and D is preferably in the range 5 to 10 mm, more preferably 7 to 9 mm. A and B are preferably 0.1 to 0.5 mm, especially 0.2 to 0.3 mm.

The cylindrical pellet has two or more flutes running along its length. The words "flute" and "channel" may be used interchangeably. The flutes may be curved or straight or a combination thereof. Preferably the flutes are straight and run axially along the exterior of the cylindrical pellet as this simplifies fabrication. The shape of the flutes may be semi-circular, elliptical, U-shaped, V-shaped, Π-shaped or a variant of these. Semi-circular, elliptical and U-shaped flutes are preferred as these offer improved the strength of the resulting pellets compared to other designs.

The catalyst unit may have between 2 and 12 or more flutes, which desirably are preferably symmetrically positioned, i.e. equally spaced around the circumference of the pellet. 3-7 flutes, particularly 3, 4 or 5 flutes or channels are preferred. 5 flutes are especially preferred. Where the flutes are semi-circular, elliptical or U-shaped, they may independently have a width d" in the range of 0.1 D to 0.4 D. In particular, we have found that flute widths of 0.1 D to 0.25 D are preferred when 5 or more flutes are present, flute widths of 0.2-0.3 D are preferred when 4 flutes are present and flute widths of 0.25-0.4 D are preferred when 3 flutes are present. Flute widths may be in the range 1 to 3 mm. Flute depths are preferably in the range 0.5 to 1.5 mm. We have found particularly that it is desirable to limit the total flute width, i.e. the combined opening, to 35% of the circumference of the unit, i.e. ≤0.35(πD), as this prevents undesirable interlocking of adjacent pellets in a catalyst bed. Interlocking can reduce flow but also can give rise to broken catalyst due to leverage.

The flutes may if desired have rounded edges. This reduces interlocking and removes sharp edges that may otherwise be susceptible to attrition. Both interlocking and attrition give rise to the formation of fines and/or broken catalyst units that reduce the effectiveness of the catalyst and increase pressure drop through the catalyst bed. The rounded edges may have a radius in the range 0.03 D to 0.09 D.

In the present invention, the catalyst pellet has no through-holes. Through-holes are useful for increasing geometric surface area and further reducing pressure drop but they can reduce the crush strength of the pellets, which outweighs this benefit in water-gas shift processes.

If desired, one or both domed ends may be positioned to provide a lip on one or both ends of the cylinder portion of the pellet. The width, w', of the lip is desirably in the range 0.2 to 1.0 mm.

The water-gas shift reaction converts the majority of the CO in the synthesis gas mixture to $CO_2$ such that the product gas mixture preferably has a CO content ≤10% on a dry gas basis, more preferably ≤7.5% by volume on a dry gas basis, most preferably ≤5.0% by volume on a dry gas basis, especially ≤2.5% by volume on a dry gas basis.

The product gas stream may be used in conventional downstream processes. Where the water gas shift catalyst is a high temperature shift catalyst, the product gas stream may be subjected to one or more further shift stages, such as medium temperature shift and/or low-temperature shift over one or more copper catalysts in separate vessels, but this may not be required. Hence, the hydrogen enriched shifted gas, with or without further shifting, may be cooled to a temperature below the dew point so that the steam condenses. The de-watered shifted gas mixture may be fed to methanol, dimethyl ether, Fischer-Tropsch wax, olefin and other chemical syntheses processes, or may be subjected to a stage of $CO_2$-removal to generate a synthesis gas for ammonia synthesis, or a hydrogen stream for the generation of electrical power as part of an IGCC process.

Figure 2:
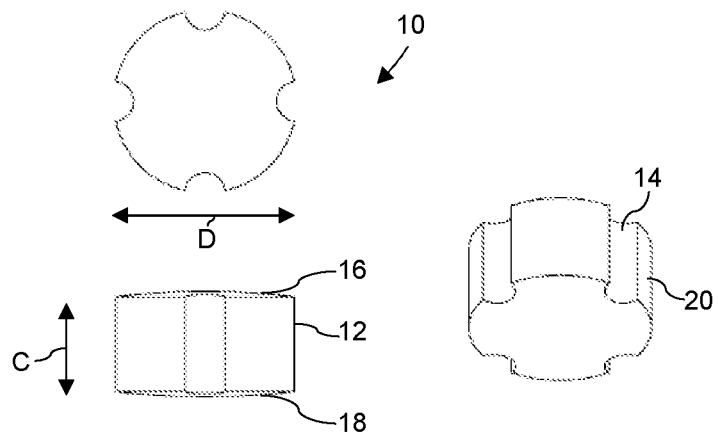
Figure 3:
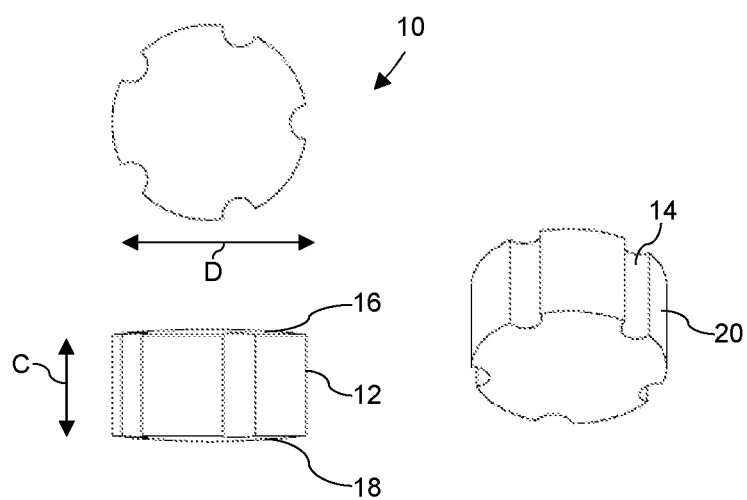

The Invention will now be further described by reference to the drawings in which;

FIG. 1 is a side view, end view and isometric depiction of a first catalyst pellet according to the present invention having three flutes, FIG. 2 is a side view, end view and isometric depiction of a second catalyst pellet according to the present invention having four flutes, and FIG. 3 is a side view, end view and isometric depiction of a third catalyst pellet according to the present invention having five flutes.

FIGS. 1, 2 and 3 together depict water-gas shift catalyst pellets 10 in the form of solid cylinders 12 having a length C and diameter D, which have three, four or five flutes 14 along its length, equally-spaced around the circumferences of the pellets 10. The cylinders 12 have domed ends 16, 18 of lengths A and B. A and B are the same. The flutes 14 create equally sized lobes 20. The evenly spaced flutes are all semi-circular in cross section.

The invention is further illustrated by reference to the following Examples.

EXAMPLE 1

Computer modelling of a series of high temperature shift catalysts catalyst was performed Examples 1a-1c relate to the 3-, 4- and 5-fluted domed cylindrical pellets depicted in FIGS. 1-3 respectively. Comparative example X is a commercially-available high temperature shift catalyst cylindrical pellet currently widely used. The dimensions of the pellets were as follows;

| Example | A mm | B mm | C mm | D mm | (A + B + C)/D | (A + B)/C | Flute size Width/depth mm |
|---|---|---|---|---|---|---|---|
| Comparative X | 0 | 0 | 4.50 | 8.50 | 0.529 | — | — |
| 1a 3 flutes | 0.25 | 0.25 | 4.50 | 8.50 | 0.588 | 0.111 | 3.1/1.24 |
| 1b 4 flutes | 0.25 | 0.25 | 4.50 | 8.50 | 0.588 | 0.111 | 2.3/0.93 |
| 1c 5 flutes | 0.25 | 0.25 | 4.50 | 8.50 | 0.588 | 0.111 | 1.8/0.75 |

Strength analysis: A COMSOL FEM software package produced simulations to assess the relative strengths of the shaped materials. A total of 10N load was applied vertically along the cross-section of the pellets. The shape was not allowed to be displaced by the applied force and the principle stress was reported along a line going through the centre of the pellet shape. (The reported values are those along the weakest plane if the shape has two directional planes). The results were normalised to the comparative example.

Voidage analysis: A DigiPac™ software package was used to simulate the packing of material in a cylindrical bed. The dimensions of the packed bed were set to 170 mm ID and 240 mm length and the simulated voidage was noted at the centre of the bed length to avoid the impacts of the 'end effects'. The resolution used was at 0.2 mm/pixel. The results were normalised to the comparative example.

Simulation of the pellet strength and flow under the same conditions gave the following;

| Example | Relative Crush Strength | Relative Voidage |
|---|---|---|
| X | 1.00 | 1.00 |
| 1a | 0.70 | 1.07 |
| 1b | 1.00 | 1.07 |
| 1c | 1.20 | 1.09 |

The results show the catalyst units according to the invention have a higher voidage (and so improved pressure drop) and for 4 and 5 flutes, the same or better crush strength than the commercially available catalyst.

EXAMPLE 2

A co-precipitated high temperature shift catalyst composition comprising a mixture of oxides of iron, chromium and aluminium and containing acicular iron oxide particles, was prepared according to U.S. Pat. No. 5,656,566. The powder composition was pelleted using a single punch press to the 5-fluted shape of Example 1c. The catalyst powder composition was doped with a small amount of graphite lubricant to aid pellet ejection from the pelleting die and pelleted to a typical product pellet density (1.8-2.0 g/cc) using normal production loads. The resulting fluted pellets had a strength equivalent to typical production cylindrical pellets of similar dimensions. A comparative cylindrical pellet was prepared from the same composition and pelleted in the same manner to the simple cylindrical shape of Comparative Example X.

The pellets were tested for the water gas shift reaction on a typical hydrogen synthesis gas composition (comprising 15.4 vol % CO, 6.8 vol % $CO_2$, 70.8 vol % $H_2$, and 7.0 vol % $N_2$) at an inlet temperature of 300-450° C., a pressure of 27 barg, and a gas hourly space velocity (GHSV) of 85,000 $hr^{-1}$. The % molar CO conversion was calculated by using an Emerson X-Stream 4 channel IR spectrometer to measure the CO concentration in the dry inlet and outlet gases and determine the volume of CO consumed during the reaction. The results were as follows;

| | CO Conversion (mole %) Temperature (° C.) | | | | | | |
|---|---|---|---|---|---|---|---|
| | 300 | 325 | 350 | 375 | 400 | 425 | 450 |
| Comparative X | 3 | 5 | 12 | 20 | 28 | 33 | 35 |
| Example 2 | 3 | 6 | 13 | 23 | 32 | 37 | 41 |

The results indicate enhanced water gas shift conversion from the domed, fluted catalyst.

The pressure drop through the bed of pellets was calculated based on the voidage numbers generated by the DigiPac™ software simulations and the use of the Ergun Equation. The results were as follows;

| | Relative pressure drop |
|---|---|
| Comparative X | 1.0 |
| Example 2 | 0.8 |

The results indicate a reduced pressure drop from a bed of the domed, fluted catalyst. A reduced pressure drop in water gas shift offers considerable advantages in downstream processes in particular in hydrogen and ammonia plants.

EXAMPLE 3

The comparative pellets and the domed, fluted pellets described in Example 2 were tested for the water gas shift reaction on a typical ammonia synthesis gas composition (comprising 14.0 vol % CO, 6.5 vol % $CO_2$, 55.5 vol % $H_2$, 0.5 vol % $CH_4$ and 23.5 vol % $N_2$) at an inlet temperature of 300-450° C., a pressure of 27 barg, and a gas hourly space velocity (GHSV) of 85,000 $hr^{-1}$. The % molar CO conversion was calculated by using an Emerson X-Stream 4 channel IR spectrometer to measure the CO concentration in the dry inlet and outlet gases and determine the volume of CO consumed during the reaction. The results were as follows;

| | CO Conversion (mole %) Temperature (° C.) | | | | | | |
|---|---|---|---|---|---|---|---|
| | 300 | 325 | 350 | 375 | 400 | 425 | 450 |
| Comparative X | 3 | 5 | 12 | 20 | 28 | 33 | 35 |
| Example 3 | 4 | 6 | 13 | 24 | 30 | 37 | 41 |

The results, which are very similar to those observed for the hydrogen syngas in Example 2 indicate enhanced water gas shift conversion from domed, fluted catalyst.

The invention claimed is:

1. A process for increasing the hydrogen content of a synthesis gas comprising hydrogen, carbon monoxide, and carbon dioxide, the process comprising the step of passing a synthesis gas mixture comprising the synthesis gas and steam at an inlet temperature in the range of from 300° C. to 500° C. over a high temperature water-gas shift catalyst to form a hydrogen-enriched shifted gas mixture,
wherein the high temperature water-gas shift catalyst is in the form of a cylindrical pellet having a cylindrical portion length C and diameter D, wherein the cylindrical pellet has two or more flutes running along its length, said cylinder having no through-holes and domed ends of lengths A and B such that (A+B+C)/D defines a ratio of overall length:diameter that is in the range 0.25 to 1.25, and (A+B)/C is in the range of from 0.05 to 0.25.

2. The process according to claim 1, wherein the synthesis gas is derived by catalytic steam reforming, autothermal reforming or secondary reforming a hydrocarbon or gasifying coal, petroleum coke or biomass.

3. The process according to claim 1, wherein the synthesis gas has a carbon monoxide content in a range of from 3 to 70 mole % on a dry-gas basis.

4. The process according to claim 1, wherein the volume ratio of the steam:the synthesis gas in the synthesis gas mixture is in a range of from 0.3:1 to 4:1.

5. The process according to claim 1, wherein the water gas shift catalyst is a high temperature water-gas shift catalyst and the inlet temperature is in a range of from 310° C. to 500° C.

6. The process according to claim 5, wherein the high temperature water-gas shift catalyst comprises one or more iron oxides stabilized with chromia and/or alumina and optionally zinc oxide and one or more copper compounds.

7. The process according to claim 6, wherein the high temperature water-gas shift catalyst is a chromia-promoted magnetite catalyst containing acicular iron oxide particles.

8. The process according to claim 1, wherein (A+B+C)/D is in a range of from 0.50 to 1.00.

9. The process according to claim 1, wherein (A+B)/C is in a range of from 0.10 to 0.25.

10. The process according to claim 1, wherein the cylindrical pellet has 3 to 12, flutes running axially along its length.

11. The process according to claim 1, wherein the flutes are equally spaced about the circumference of the cylindrical pellet.

12. The process according to claim 1, wherein the flutes are semi-circular, elliptical, or U shaped.

13. The process according to claim 12, wherein there are 3, 4 or 5 flutes present that have a width "d" in the range of 0.1 D to 0.4 D.

14. The process according to claim 1, wherein the two or more flutes running along the length of the cylindrical pellet have a cumulative flute width that does not exceed 35% of the circumference of the cylindrical pellet.

15. The process according to claim 1, wherein (A+B+C)/D is in a range of from 0.55 to 0.70.

16. The process according to claim 1, wherein (A+B+C)/D is in a range of from 0.55 to 0.66.

17. The process according to claim 1, wherein the cylindrical pellet has 3 to 7 flutes running axially along its length.

18. The process according to claim 1, wherein the cylindrical pellet has 3 to 5 flutes running axially along its length.

* * * * *